(12) United States Patent
Liu

(10) Patent No.: US 10,015,371 B2
(45) Date of Patent: Jul. 3, 2018

(54) ELECTRONIC DEVICE AND IMAGE TRACKING METHOD THEREOF

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Cheng-Xiang Liu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 150 days.

(21) Appl. No.: 15/169,763

(22) Filed: Jun. 1, 2016

(65) Prior Publication Data

US 2016/0366308 A1 Dec. 15, 2016

(30) Foreign Application Priority Data

Jun. 12, 2015 (CN) .......................... 2015 1 0322075

(51) Int. Cl.
*G06T 7/254* (2017.01)
*H04N 5/14* (2006.01)
*G06T 7/246* (2017.01)
*H04N 5/232* (2006.01)

(52) U.S. Cl.
CPC ............ *H04N 5/144* (2013.01); *G06T 7/248* (2017.01); *G06T 7/254* (2017.01); *H04N 5/147* (2013.01); *H04N 5/232* (2013.01)

(58) Field of Classification Search
CPC .................................. H04N 5/144; G06T 7/254
See application file for complete search history.

(56) References Cited

U.S. PATENT DOCUMENTS

| | | | | |
|---|---|---|---|---|
| 6,335,985 | B1 * | 1/2002 | Sambonsugi | G06K 9/3241 382/190 |
| 7,088,773 | B2 * | 8/2006 | Paniconi | G06K 9/34 348/E5.066 |
| 7,760,956 | B2 * | 7/2010 | Lin | G06K 9/00711 382/254 |
| 7,929,613 | B2 * | 4/2011 | Kamijo | G06K 9/00785 375/240.08 |
| 8,325,227 | B2 * | 12/2012 | Lin | G06T 7/254 348/143 |
| 8,830,346 | B2 * | 9/2014 | Watanabe | G06K 9/00295 348/169 |
| 8,989,256 | B2 * | 3/2015 | Wilkins | H04N 19/513 375/240 |
| 9,025,885 | B2 * | 5/2015 | Alpert | G06K 9/481 348/208.99 |
| 9,280,649 | B2 * | 3/2016 | Matsuda | G06K 9/00362 |
| 9,311,338 | B2 * | 4/2016 | Muthuswamy | G06K 9/00456 |

(Continued)

*Primary Examiner* — Jay Patel
*Assistant Examiner* — Irfan Habib
(74) *Attorney, Agent, or Firm* — ScienBiziP, P.C.

(57) ABSTRACT

An electronic device able to receive a target frame for tracking a moving target which is included in a search reference sets at least one first detecting region in the target frame. The processor determines similarities between the search reference and the at least one first detecting regions. Then, the processor determines a specific first detecting region in the target frame and determines an actual position of the moving target based on the specific first detecting region.

13 Claims, 12 Drawing Sheets

(56) References Cited

U.S. PATENT DOCUMENTS

| | | | |
|---|---|---|---|
| 9,426,337 B2* | 8/2016 | Slutsky | H04N 7/0127 |
| 2002/0012449 A1* | 1/2002 | Bradski | G06K 9/00234 |
| | | | 382/103 |
| 2007/0250898 A1* | 10/2007 | Scanlon | G06K 9/00771 |
| | | | 725/135 |
| 2010/0157064 A1* | 6/2010 | Cheng | G06K 9/00771 |
| | | | 348/169 |
| 2010/0310122 A1* | 12/2010 | Xie | G06K 9/00771 |
| | | | 382/103 |
| 2011/0254976 A1* | 10/2011 | Garten | G06F 3/1454 |
| | | | 348/229.1 |
| 2012/0069203 A1* | 3/2012 | Voss | H04N 5/144 |
| | | | 348/208.1 |
| 2012/0189167 A1* | 7/2012 | Kurata | H04N 5/145 |
| | | | 382/107 |
| 2012/0269444 A1* | 10/2012 | Naito | H04N 5/23229 |
| | | | 382/197 |
| 2013/0083162 A1* | 4/2013 | Wang | H04N 13/0022 |
| | | | 348/43 |
| 2013/0093906 A1* | 4/2013 | Carlsson | H04N 5/23258 |
| | | | 348/208.99 |
| 2013/0307974 A1* | 11/2013 | Kawano | G06K 9/00771 |
| | | | 348/143 |
| 2013/0322766 A1* | 12/2013 | Alpert | G06K 9/481 |
| | | | 382/197 |
| 2014/0085545 A1* | 3/2014 | Tu | G06K 9/00771 |
| | | | 348/659 |
| 2014/0247374 A1* | 9/2014 | Murakami | H04N 5/23219 |
| | | | 348/222.1 |
| 2017/0024899 A1* | 1/2017 | Hammoud | H04W 4/025 |
| 2017/0083748 A1* | 3/2017 | Zhou | G06K 9/0063 |

\* cited by examiner

|   |   |   |   |   |   |   |   |   |
|---|---|---|---|---|---|---|---|---|
| 3 | 4 | 5 | 8 | 8 | 9 | 6 | 5 | 3 | 1 |
| 5 | 6 | 6 | 8 | 2 | 4 | 8 | 7 | 6 | 2 |
| 3 | 6 | 6 | 5 | 4 | 6 | 5 | 5 | 4 | 3 |
| 4 | 5 | 3 | 6 | 6 | 9 | 3 | 4 | 5 | 4 |
| 5 | 6 | 7 | 6 | 6 | 0 | 1 | 2 | 5 | 5 |
| 6 | 7 | 4 | 3 | 7 | 4 | 6 | 5 | 5 | 6 |
| 4 | 5 | 6 | 7 | 8 | 8 | 8 | 8 | 2 |
| 6 | 8 | 7 | 4 | 2 | 3 | 6 | 5 | 1 | 2 |
| 5 | 6 | 9 | 8 | 4 | 7 | 5 | 6 | 5 | 5 |
| 1 | 5 | 7 | 8 | 2 | 6 | 4 | 9 | 5 | 2 |

ELECTRONIC DEVICE AND IMAGE TRACKING METHOD THEREOF

CROSS-REFERENCE TO RELATED APPLICATIONS

This application claims priority to Chinese Patent Application No. 201510322075.6 filed on Jun. 12, 2015, the contents of which are incorporated by reference herein.

FIELD

The subject matter herein generally relates to image tracking in displays.

BACKGROUND

Since it is hard for the existing background generation methods to generate a whole background based on a video having a moving object, the tracking of the moving object in the video is not precise.

BRIEF DESCRIPTION OF THE DRAWINGS

Implementations of the present technology will now be described, by way of example only, with reference to the attached figures.

FIG. 3 is a diagrammatic view of one embodiment of three initial frames in the moving target tracking system of FIG. 2.

FIG. 4 is a diagrammatic view of one embodiment of two differential frames in the moving target tracking system of FIG. 2.

DETAILED DESCRIPTION

Figure 1:
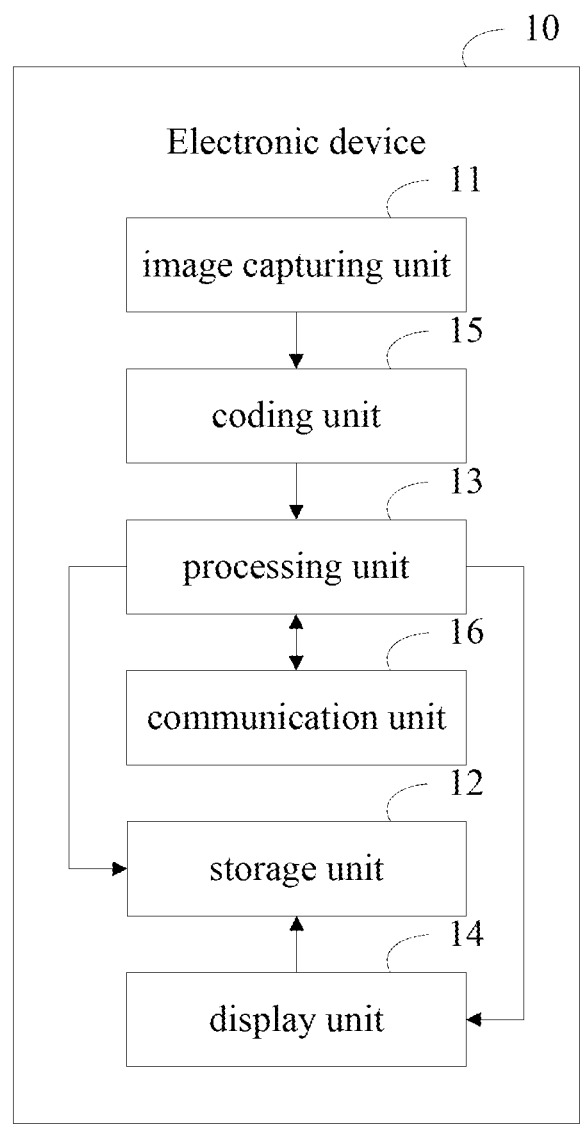
FIG. 1 is a block diagram of one embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "comprising" means "including, but not necessarily limited to"; it specifically indicates open-ended inclusion or membership in a so-described combination, group, series, and the like.

FIG. 1 illustrates an embodiment of an electronic device 10. In the embodiment, the electronic device 10 can include an image capturing unit 11, a storage unit 12, a processing unit 13, a display unit 14, a coding unit 15, and a communication unit 16. The storage unit 12 can store a plurality of instructions. When the instructions are executed by the processing unit 13, the processing unit 13 receives a target frame for tracking a moving target included in a search reference, and sets at least one first detecting region in the target frame. The processing unit 13 determines at least one similarity between the search reference and the at least one first detecting region. Then, the processing unit 13 determines a specific first detecting region in the target frame based on the at least one similarity, and determines a position of the moving target therein.

In at least one embodiment, the image capturing unit 11 can capture a video for tracking of a moving object. In at least one embodiment, the coding unit 15 receives a plurality of initial images from the video captured by the image capturing unit 11 or a video stored in the storage unit 12, and converts the plurality of initial images into a plurality of digital frames. In one embodiment, the processing unit 13 can set at least three consecutive digital frames as an equal number of initial frames. In other embodiments, each time interval between each of the plurality of digital frames is predefined. The processing unit 13 can select at least three digital frames over three consecutive predefined intervals as the at least three initial frames. Then, the processing unit 13 can calculate a background frame based on the at least three initial frames.

In at least one embodiment, the processing unit 13 receives a reference frame, and compares the reference frame with the background frame to detect the moving target and to determine a reference position of the moving target. The processing unit 13 sets the search reference in the reference frame according to the reference position. Then, the processing unit 13 receives the target frame, and sets a search region in the target frame according to the reference position. The processing unit 13 sets at least one detecting region in the search region of the target frame.

In at least one embodiment, the processing unit 13 traces the moving target based on the at least one similarity between the search reference and the at least one detecting region to determine an actual position of the moving target in the target frame.

In at least one embodiment, the processing unit 13 can set the target frame as a new reference frame, and determine a new search reference in the new reference frame based on the actual position of the moving target in the new reference frame. In at least one embodiment, the center of the new search reference can be the centroid of the moving target in the new reference frame.

In at least one embodiment, the processing unit 13 receives a new target frame and determines a new search region based on the actual position of the moving target in the new reference frame. In at least one embodiment, the center of the new search region can be determined based on the position of the centroid of the moving target in the new reference frame.

In at least one embodiment, the processing unit 13 traces the moving target based on at least one similarity between the search reference and at least one new detecting region to determine a new actual position of the moving target in the new target frame.

In at least one embodiment, the processing unit 13 controls the display unit 14 to show the result of tracking.

The image capturing unit 11 can be a charge-coupled device (CCD) image sensor, a complementary metal-oxide-semiconductor (CMOS) image sensor, or a camera.

The storage unit 12 can be a non-volatile computer readable storage medium that can be electrically erased and reprogrammed, such as read-only memory (ROM), random-access memory (RAM), erasable programmable ROM (EPROM), electrically erasable programmable ROM (EEPROM), hard disk, solid state drive, or other forms of electronic, electromagnetic, or optical recording medium. In at least one embodiment, the storage unit 12 can include interfaces that can access the aforementioned computer readable storage medium to enable the electronic device 10 to connect and access such computer readable storage medium. In at least one embodiment, the storage unit 12 can be a smart media card, a secure digital card, or a flash card.

The processing unit 13 can be a processor, a central processor unit (CPU), a graphic processor unit (GPU), a digital signal processor (DSP), a system on chip (SoC), a field-programmable gate array (FPGA), or a controller for executing the program instruction in the storage unit 12 which can be static RAM (SRAM), dynamic RAM (DRAM), EPROM, EEPROM, flash memory, or other types of computer memory. The processing unit 13 can further include an embedded system or an application specific integrated circuit (ASIC) having embedded program instructions.

The display unit 14 can show the execution of a predefined function. The display unit 14 can comprise a display device using liquid crystal display (LCD) technology, or light emitting polymer display (LPD) technology, although other display technologies can be used in other embodiments.

The communication unit 16 can adopt customized protocols or follow existing de facto standards such as Ethernet, IEEE 802.11 or IEEE 802.15 series, Wireless USB or telecommunication standards such as GSM, CDMA2000, TD-SCDMA, WiMAX, 3GPP-LTE, or TD-LTE. In some embodiments, the communication unit 16 can be a customized connector or a standard connector such as USB connector.

In at least one embodiment, the electronic device 10 can be a mobile phone, a tablet, a computer, a server, or other electronic device. FIG. 1 illustrates only one example of an electronic device 10, the electronic device in other embodiments can include more or fewer components than illustrated, or have a different configuration of the various components.

Figure 2:
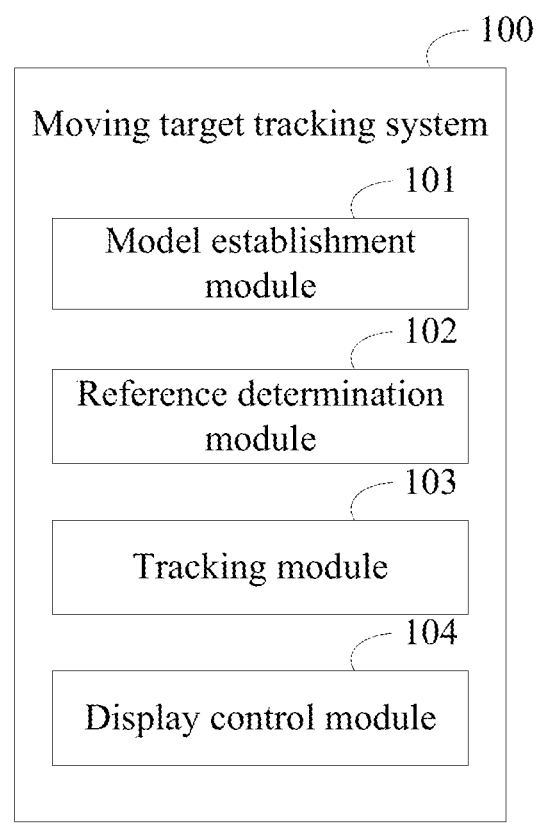
FIG. 2 is a block diagram of one embodiment of function modules of a moving target tracking system in the electronic device of FIG. 1.
Figure 5:
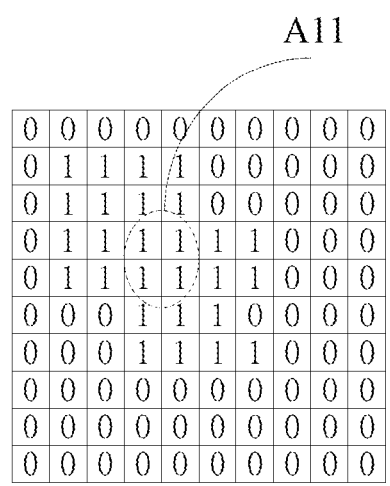
FIG. 5 is a diagrammatic view of one embodiment of two adjusted frames in the moving target tracking system of FIG. 2.

FIG. 2 illustrates an embodiment of function modules of the moving target tracking system 100 in the electronic device 10 of FIG. 1. In at least one embodiment, the moving target tracking system 100 can include one or more modules, for example, a model establishment module 101, a reference determination module 102, a tracking module 103, and a display control module 104. "Module," as used herein, refers to logic embodied in hardware or firmware, or to a collection of software instructions, written in a programming language, such as, JAVA, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

In at least one embodiment, the model establishment module 101 receives an initial image at a predefined interval, and determines whether the number of the received initial images is less than three. In at least one embodiment, the model establishment module 101 sets a second frame in the initial frames as a background reference if there is no background frame. In at least one embodiment, the model establishment module 101 can set the background references for generating the background frame.

In at least one embodiment, the model establishment module 101 can generate differential frames $D_k$ and $D_{k+1}$ based on the three initial frames. For example, as shown in FIGS. 3(a)-(c), the model establishment module 101 can receive three initial frames $I_{k-1}$, $I_k$, and $I_{k+1}$. The numbers in the three initial frames can be pixel values in the three initial frames. The model establishment module 101 subtracts the first initial frame $I_{k-1}$ from the second initial frame $I_k$ to generate a first subtracted frame, and subtracts the second initial frame $I_k$ from the third initial frame $I_{k+1}$ to generate a second subtracted frame. The model establishment module 101 can convert the first subtracted frame into a first differential frame $D_k$, and convert the second subtracted frame into a second differential frame $D_{k+1}$ by thresholding, as shown in FIGS. 4(a)-(b).

In at least one embodiment, the model establishment module 101 can check continuity of the differential frames to adjust the differential frames. For example, as shown in FIGS. 4(a)-(b) and FIGS. 5(a)-(b), the model establishment module 101 can check continuity of the differential frames $D_k$ and $D_{k+1}$ to detect a discrete gap along a detecting direction based on the binary values in the differential frames. When the discrete gaps can be surrounded by line segments having the value 1, such as voids A1 and A2 in FIGS. 4(a)-(b), the model establishment module 101 can infill the voids A1 and A2 to generate the infilled regions A11 and A22 in FIGS. 5(a)-(b) to obtain a first adjusted frames $d_k$ and a second adjusted frame $d_{k+1}$. Thus, the value 0 in the voids A1 and A2 is changed into the value 1 in the infilled regions A11 and A22.

In at least one embodiment, as shown in FIGS. 6(a)-(b), the model establishment module 101 can determine that a discrete gap G8 between the line segments S2 and S3 is surrounded by the line segment S2-S4. Thus, the model establishment module 101 can adjust the discrete gap G8 to become line segment S8. In addition, the model establishment module 101 can determine that a discrete gap G9 between line segments S5 and S6 is surrounded by line segment S4-S7. Thus, the model establishment module 101 can adjust the discrete gap G9 to become line segment S9.

In at least one embodiment, the model establishment module 101 subtracts the second adjusted frames $d_{k+1}$ from the first adjusted frame $d_k$, and converts the result of subtraction into a parameter frame $d_{k+1}{}^1$, and generates a new background frame based on the original background frame.

In at least one embodiment, the model establishment module 101 can determine whether the new background frame is stable or changing. If the new background frame is changing, the model establishment module 101 can receive a new initial frame to recalculate the new background frame. If the new background frame is stable, the model establishment module 101 sets the new background frame as a background model. In at least one embodiment, the background model can be used as the background frame for tracing a moving target.

In at least one embodiment, the reference determination module 102 detects a moving target based on a reference frame and the background frame, and determines a reference position of the moving target in the reference frame.

In at least one embodiment, the reference determination module 102 can determine a search reference in the reference frame based on the reference position of the moving target in the reference frame, and determine a search region in a target frame based on the reference position of the moving target in the reference frame.

In at least one embodiment, the reference determination module 102 converts the color pixels in the search reference of the reference frame into grayscale pixels, and converts the color pixels in an extended search region of the target frame into grayscale pixels. The area of the extended search region of the target frame is larger than the area of the search region.

Figure 7:
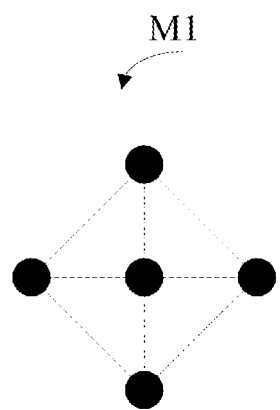
FIG. 7 is a diagrammatic view of one embodiment of a small cross formed by the detecting points in the moving target tracking system of FIG. 2.

In at least one embodiment, the tracking module 103 determines similarities between the search reference and first detecting regions to obtain a specific first detecting region which is more similar to the search reference than the other first detecting regions. Each of the first detecting regions has a first detecting point. In at least one embodiment, as shown in FIG. 7, the tracking module 103 can set a group of the central point of the search region and four first surrounding points, the group being formed in the shape of a small cross M1, as first detecting points. The tracking module 103 determines that the five first detecting points can be the centers of the first detecting regions.

In at least one embodiment, the tracking module 103 determines whether the specific first detecting point of the specific first detecting region is the central point of the search region. If the specific first detecting point of the specific first detecting region is the central point of the search region, the tracking module 103 can stop searching and determine the specific first detecting point as a matching point. Thus, the tracking module 103 can determine that the specific first detecting region corresponding to the matching point is a matching region and that the matching point is an actual position of the moving target in the target frame. If the specific first detecting point of the specific first detecting region is not the central point of the search region, the tracking module 103 can continuously search for the moving target. In at least one embodiment, the specific first detecting point is one of the first detecting points corresponding to the specific first detecting region.

In at least one embodiment, the tracking module 103 can set a group of the specific first detecting point and four second surrounding points as second detecting points. The central point of the four second surrounding points is the specific first detecting point, and one of the four second surrounding points is the central point of the search region. Then, the tracking module 103 determines similarities between the search reference and second detecting regions to obtain a specific second detecting region which is more similar to the search reference than the other second detecting regions. Each of the second detecting regions has the second detecting point.

In at least one embodiment, the tracking module 103 determines whether the specific second detecting point of the specific second detecting region is the specific first detecting point. If the specific second detecting point is the specific first detecting point, the tracking module 103 can stop searching and determine that the specific second detecting point is the matching point. Thus, the tracking module 103 can determine that the specific second detecting region corresponding to the matching point is the matching region and that the matching point is the actual position of the moving target in the target frame. If the specific second detecting point is not the specific first detecting point, the tracking module 103 can continuously search for the moving target. In at least one embodiment, the specific second detecting point is one of the second detecting points corresponding to the specific second detecting region.

Figure 8:
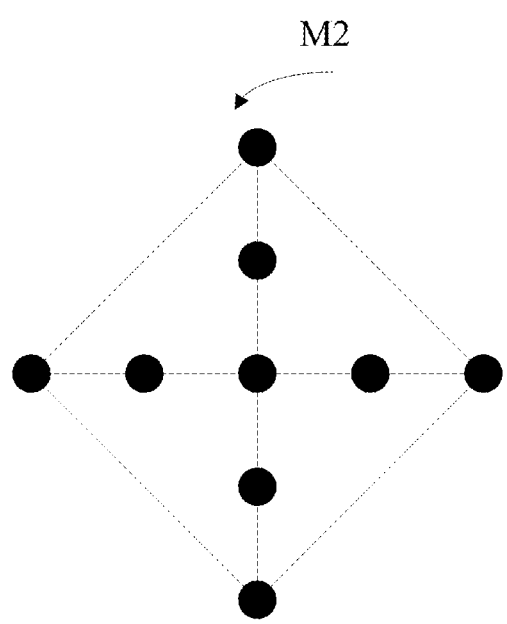
FIG. 8 is a diagrammatic view of one embodiment of a large cross formed by the detecting points in the moving target tracking system of FIG. 2.

In at least one embodiment, the tracking module 103 determines whether the specific second detecting point of the specific second detecting region is an external point. In at least one embodiment, as shown in FIG. 8, the tracking module 103 can create a group of the central point of the search region, four first surrounding points, and four external points, the group being formed in the shape of a large cross M2. Therefore, the tracking module 103 can determine whether the specific second detecting point is one of the four external points based on the large cross M2. If the specific second detecting point of the specific second detecting region is not an external point, the tracking module 103 can search the matching region based on the specific second detecting point, via diamond search method. The diamond search method is well known in this context. Then, the tracking module 103 can determine the matching point based on the matching region and determine that the matching point is the actual position of the moving target in the target frame.

If the specific second detecting point of the specific second detecting region is an external point, the tracking module 103 determines similarities between the search reference and third detecting regions to obtain a specific third detecting region which is more similar than the other third detecting regions. Each of the third detecting regions has a third detecting point which is one of the external points. Then, the tracking module 103 can search the matching region based on the specific third detecting region via diamond search method. Then, the tracking module 103 can determine the matching point based on the matching region, and determine that the matching point is the actual position of the moving target in the target frame.

In at least one embodiment, the display control module 104 controls the display unit 14 to show the result of tracking.

Figure 9:
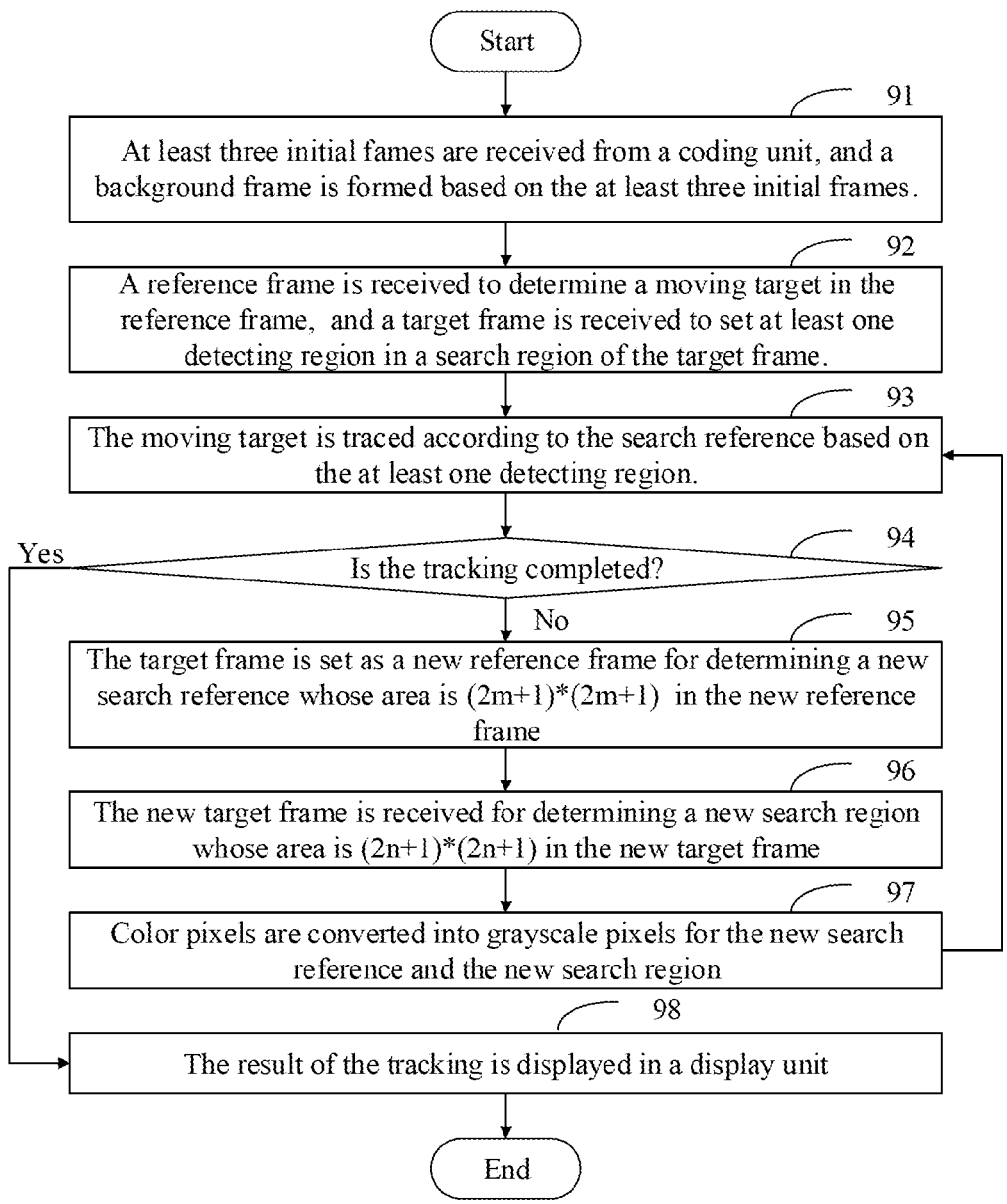
FIG. 9 illustrates a flowchart of one embodiment of an image tracking method for the electronic device of FIG. 1.

FIG. 9 illustrates a flowchart of a method in accordance with an example embodiment. The example method is provided by way of example, as there are a variety of ways to carry out the method. The method described below can be carried out using the configuration illustrated in FIG. 1, for example, and various elements of these figures are referenced in explaining example method. Each block shown in FIG. 9 represents one or more processes, methods, or subroutines, carried out in the example method. Furthermore, the order of blocks is illustrative only and can change. Additional blocks can be added or fewer blocks can be utilized, without departing from this disclosure. The example method can begin at block 91.

At block 91, the model establishment module 101 receives at least three initial frames. In at least one embodiment, the at least three initial frames are converted from at least three initial images by the coding unit 15. The model establishment module 101 generates a background frame based on the initial frames.

In at least one embodiment, the coding unit 15 receives a plurality of initial images from a video, and converts the plurality of initial images into a plurality of digital frames. In one embodiment, the at least three initial frames can be set by the model establishment module 101 as at least three consecutive digital frames. In at least one embodiment, each time interval between each of the plurality of digital frames is predefined. The model establishment module 101 can select at least three digital frames over at least three consecutive predefined intervals as the at least three initial frames. Then, the model establishment module 101 can calculate the background frame based on the at least three initial frames. A detailed description of block 91 refers to FIG. 10.

At block 92, the reference determination module 102 receives a reference frame for determining a moving target. Then, the reference determination module 102 receives a target frame and sets at least one detecting region in a search region of the target frame.

In at least one embodiment, the reference determination module 102 receives the reference frame, and compares the reference frame with the background frame to determine a reference position of the moving target. The reference determination module 102 sets a search reference in the reference frame according to the reference position. Then, the reference determination module 102 receives the target frame, and sets a search region in the target frame according to the reference position. The reference determination module 102 sets at least one detecting region in the search region of the target frame. A detailed description of block 92 refers to FIG. 11.

At block 93, the tracking module 103 traces the moving target according to the search reference based on the at least one detecting region.

In at least one embodiment, the tracking module 103 traces the moving target based on at least one similarity between the search reference and the at least one detecting region to determine an actual position of the moving target in the target frame. A detailed description of block 93 refers to FIG. 12.

In block 94, the tracking module 103 determines whether the tracking of the moving target is completed. If the tracking for the moving target is completed, the procedure goes to block 98. If the tracking for the moving target is not yet completed, the procedure goes to block 95.

In block 95, the reference determination module 102 sets the target frame as a new reference frame, and determines a new search reference in the new reference frame.

In at least one embodiment, the reference determination module 102 can determine the new search reference based on the actual position of the moving target in the new reference frame. In at least one embodiment, the center of the new search reference can be the centroid of the moving target in the new reference frame, and the area of the search reference can be $(2m+1)*(2m+1)$, wherein m is an integer.

In block 96, the reference determination module 102 receives a new target frame and determines a new search region in the new target frame.

In at least one embodiment, the reference determination module 102 can determine the new search region in the new target frame based on the actual position of the moving target in the new reference frame. In at least one embodiment, the center of the new search region can be determined based on the position of the centroid of the moving target in the new reference frame, and the area of the new search region can be $(2n+1)*(2n+1)$, wherein n is an integer which is larger than m.

In block 97, the reference determination module 102 converts the color pixels into grayscale pixels for the new search reference and the new search region.

In at least one embodiment, the reference determination module 102 converts the color pixels in the new search reference of the new reference frame into grayscale pixels. In at least one embodiment, the reference determination module 102 converts the color pixels in a new extended search region of the new target frame into grayscale pixels. The area of the new extended search region of the new target frame can be $(2n+m+1)*(2n+m+1)$.

In the at least one embodiment, the reference determination module 102 can convert color pixels into grayscale pixels based on a formula, $G(i,j)=r(i,j)*0.299+g(i,j)*0.587b(i,j)*0.114$ wherein $r(i,j)$, $g(i,j)$, and $b(i,j)$ are red green, and blue values representing color pixels, and $G(i,j)$ is grayscale values.

In the at least one embodiment, when the color pixels are converted into grayscale pixels by the reference determination module 102, the procedure goes back to block 93.

In block 98, the display control module 104 controls the display unit 14 to show the result of tracking.

Figure 10:
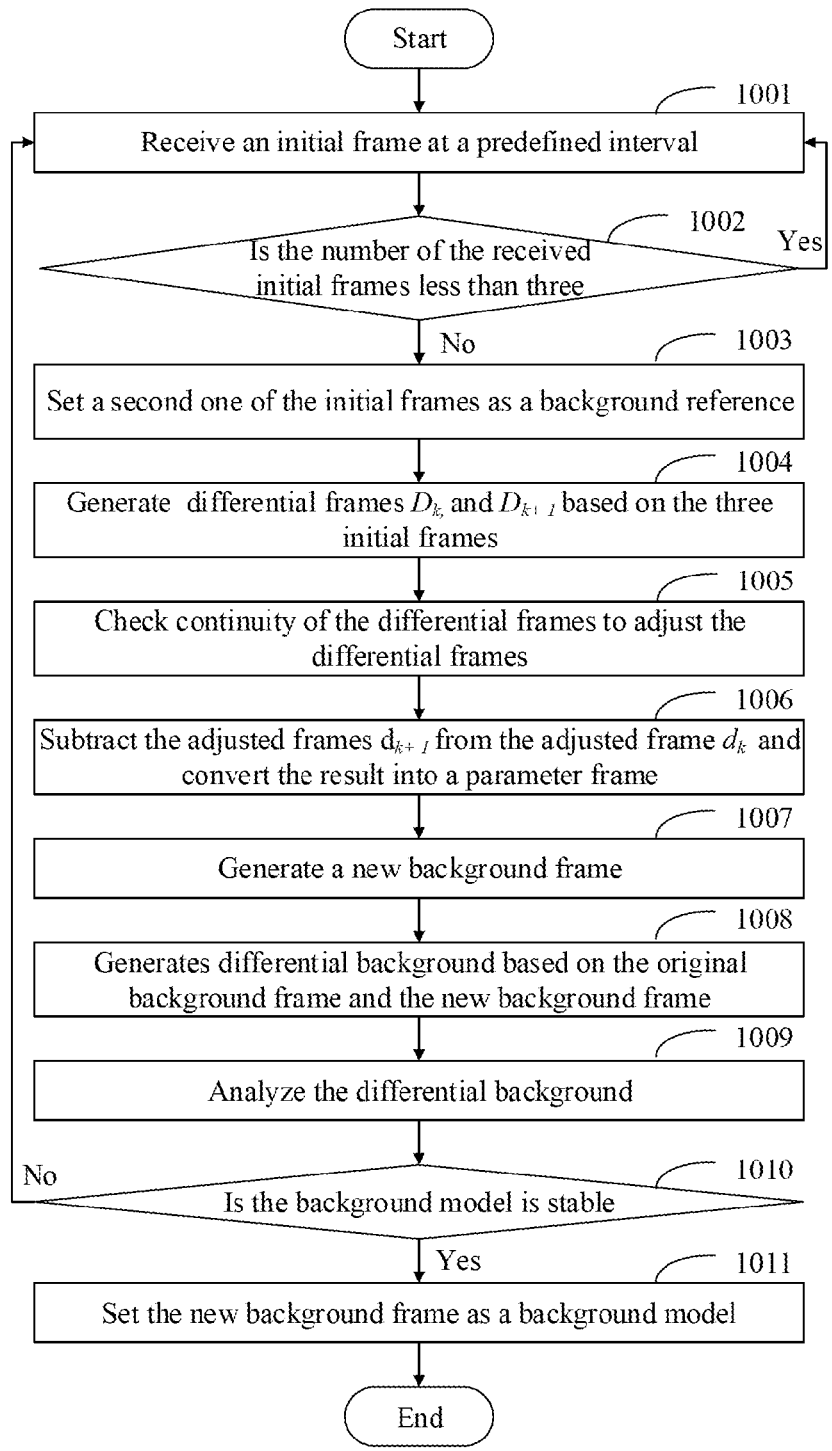
FIG. 10 illustrates a flowchart of one embodiment of a background generation method for the electronic device of FIG. 1.

FIG. 10 illustrates a flowchart of a method in accordance with an example embodiment. The example method is provided by way of example, as there are a variety of ways to carry out the method. The method described below can be carried out using the configuration illustrated in FIG. 1, for example, and various elements of these figures are referenced in explaining example method. Each block shown in FIG. 10 represents one or more processes, methods, or subroutines, carried out in the example method. Furthermore, the order of blocks is illustrative only and can change. Additional blocks can be added or fewer blocks can be utilized, without departing from this disclosure. In one embodiment, FIG. 10 shows a detailed description of the block 91 revealed in FIG. 9, and the example method can begin at block 1001.

In block 1001, the model establishment module 101 receives an initial frame at a predefined interval.

In at least one embodiment, the model establishment module 101 receives a plurality of initial frames converted from a plurality of initial images by the coding unit 15 at predefined intervals. In at least one embodiment, when the predefined interval is equal to each time interval between frames in the video, the model establishment module 101 can receive all of the initial frames.

In block 1002, the model establishment module 101 determines whether the number of the received initial frames is less than three. If the number of the received initial frames is less than three, the procedure goes back to block 1001. If the number of the received initial frames is three or more, the procedure goes to block 1003.

In at least one embodiment, the model establishment module 101 can determine whether the number of the received initial images is less than three based on the number of converted initial images. Thus, the model establishment module 101 also can determine whether the number of the initial frames is more or less than or equal to three.

In block 1003, the model establishment module 101 sets a second frame in the initial frames as a background reference. In at least one embodiment, the model establishment module 101 can set the background reference for continuously updating of the background frame.

In block 1004, the model establishment module 101 generates differential frames $D_k$ and $D_{k+1}$ based on the three initial frames.

In at least one embodiment, the model establishment module 101 can subtract a first one of the three initial frames from a second one of the three initial frames to generate a first subtracted frame, and subtract the second one of the three initial frames from a third one of the three initial frames to generate a second subtracted frame. Then, the model establishment module 101 can convert the two subtracted frames into the differential frames. In at least one embodiment, the model establishment module 101 can convert the two subtracted frames into the differential frames by thresholding. The values equal to zero in the subtracted frames can remain as zero in the differential frames, while other values in the subtracted frames can be converted to values in the differential frames by thresholding.

Figure 4:
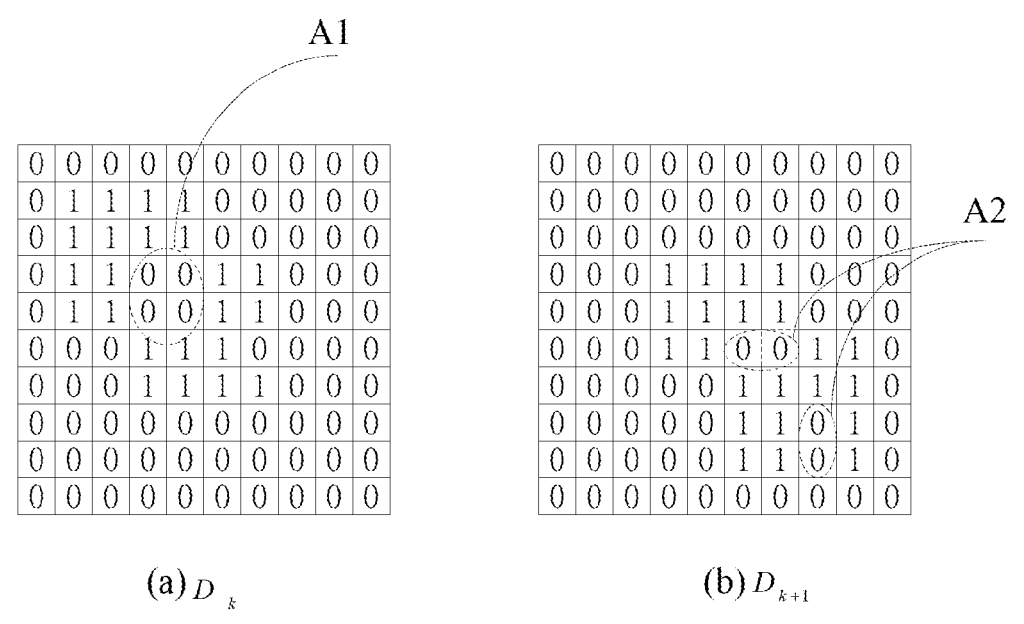

In at least one embodiment, the subtracted frame is formed by subtracting pixel values in one digital frame from pixel values in another digital frame. For example, as shown in FIGS. 3(*a*)-(*c*), the model establishment module 101 can receive three initial frames, $I_{k-1}$, $I_k$, and $I_{k+1}$. The numbers in the three initial frames can be pixel values. The model establishment module 101 subtracts the first initial frame $I_{k-1}$ from the second initial frame $I_k$ to generate the first subtracted frame, and subtracts the second initial frame $I_k$ from the third initial frame $I_{k+1}$ to generate a second subtracted frame. The model establishment module 101 can convert the first subtracted frame into a first differential frame $D_k$, and convert the second subtracted frame into a second differential frame $D_{k+1}$, by thresholding, as shown in FIGS. 4(*a*)-(*b*).

In block 1005, the model establishment module 101 checks continuity of the differential frames to adjust the differential frames.

In at least one embodiment, the model establishment module 101 can detect a discrete gap in the differential frames $D_k$ and $D_{k+1}$ and adjust the values of the discrete gap in the differential frames $D_k$ and $D_{k+1}$. For example, as shown in FIGS. 4(*a*)-(*b*) and FIGS. 5(*a*)-(*b*), the model establishment module 101 can check continuity of the differential frames $D_k$ and $D_{k+1}$ to detect a discrete gap along a detecting direction based on the binary values in the differential frames. When the discrete gaps are surrounded by line segments having the value 1, such as voids A1 and A2 in FIGS. 4(*a*)-(*b*), the model establishment module 101 can infill the voids A1 and A2 to generate the infilled regions A11 and A22 in FIGS. 5(*a*)-(*b*). Thus, the value 0 in the voids A1 and A2 is changed into the value 1 in the infilled regions A11 and A22.

In at least one embodiment, when the model establishment module 101 detects the discrete gap in the differential frames, the model establishment module 101 can detect along a detecting direction, for adjusting the differential frames. For example, when the model establishment module 101 detects two line segments and a discrete gap between the two line segments along a first line, the model establishment module 101 can set the two line segments to be included in a first connection region and a second connection region. Then, the model establishment module 101 can detect line segments along a second line neighboring the first line, and determine whether the line segments in the second line can couple together the two line segments of the first line. If the line segments in the second line can couple together the two line segments of the first line, the model establishment module 101 can add the two line segments of the first line and the second line into the same connection region, and adjust the discrete gap surrounded by the two line segments of the first line and the line segment of the second line to become new line segment.

Figure 6:
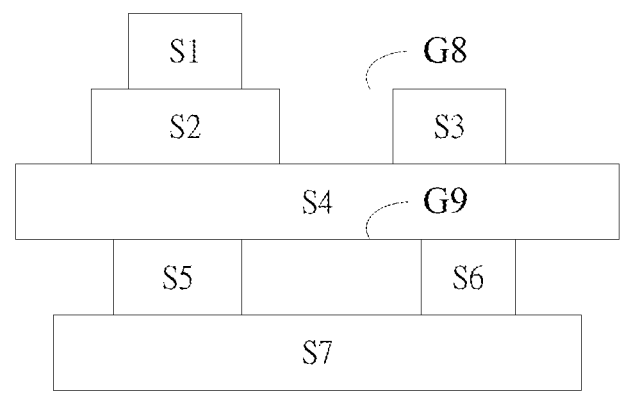
FIG. 6 is a diagrammatic view of one embodiment of an original frame with discrete gaps and an adjusted frame without the discrete gaps in the moving target tracking system of FIG. 2.
Figure 6:
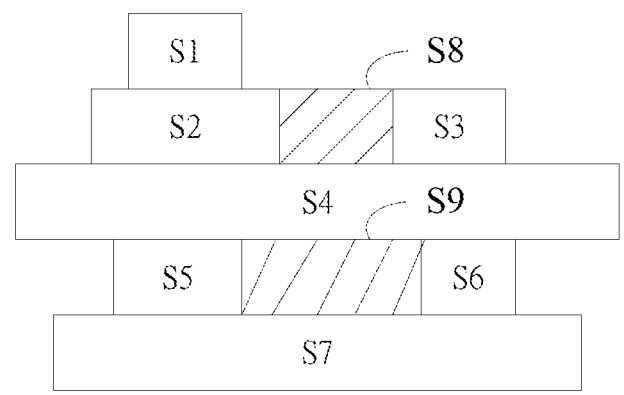

As shown in FIGS. 6(*a*)-(*b*), the model establishment module 101 can detect in the differential frames a line segment S1 along a first line according to the value 1, and set the line segment S1 to be included in a first connection region. Then, the model establishment module 101 can detect line segments S2 and S3 along a second line and a discrete gap G8 between the line segments S2 and S3. Since the line segment S2 can be coupled to the line segment S1, the model establishment module 101 can add the line segment S2 into the first connection region, and set the line segment S3 to be included in a second connection region. The model establishment module 101 can further detect line segment S4 along a third line. Since the line segment S4 can couple the line segment S2 to the line segment S3, the model establishment module 101 can add the line segments S3 and S4 into the first connection region, and delete the second connection region. Thus, the discrete gap G8 surrounded by the line segments S2-S4 can be adjusted to become line segment S8 by the model establishment module 101. In addition, the model establishment module 101 can detect line segments S5 and S6 along a fourth line and a discrete gap G9 between the line segments S5 and S6. Since the line segments S5 and S6 can be coupled to the line segment S4, the model establishment module 101 can add the line segments S5 and S6 into the first connection region, and adjust the discrete gap G9 surrounded by the line segment S4-S6 to become line segment S9. The model establishment module 101 can further detect a line segment S7 along a fifth line and add the line segment S7 into the first connection region since the line segment S7 can couple the line segment S5 to the line segment S6.

In block 1006, the model establishment module 101 subtracts the second adjusted frame $d_{k+1}$ from the first adjusted frame $d_k$ and converts the result into a parameter frame $d_{k+1}^k$. In at least one embodiment, the model establishment module 101 can convert the result into the parameter frame $d_{k+1}^k$ by thresholding. The values equal to zero can remain as zero in the parameter frame $d_{k+1}^k$, while other values can be converted as one in the parameter frame $d_{k+1}^k$ during the thresholding.

In block 1007, the model establishment module 101 generates a new background frame based on the original background frame.

In at least one embodiment, the model establishment module 101 can generate the new background frame based on a formula, $B_{k+1}(i,j)=d_{k+1}^k(i,j)*I_{k+1}(i,j)+[1-d_{k+1}^k(i,j)]*B_k(i,j)$, wherein $B_1(i,j)$ is the background reference, $B_{k+1}(i,j)$ is the new background reference, and K is an integer.

In block 1008, the model establishment module 101 generates differential background $DB_k$ based on the original background frame and the new background frame.

In at least one embodiment, the model establishment module 101 can subtract the original background frame from the new background frame to generate a subtracted background. Then, the model establishment module 101 can convert the subtracted background into the differential background. In at least one embodiment, the model establishment module 101 can convert the subtracted background into the differential background by thresholding. The values equal to zero in the subtracted background can remain as zero in the differential background, while other values in the subtracted background can be converted as one in the differential background during the thresholding.

In block 1009, the model establishment module 101 analyzes the differential background to adjust the differential background. In at least one embodiment, the model establishment module 101 can analyze the differential background to adjust the differential background based on mathematical morphology method. The mathematical morphology method is well known in the art.

In block 1010, the model establishment module 101 determines whether the new background frame is a stable or a changing background. If the new background frame is a changing background, the procedure goes back to block 1001. If the new background frame is a stable background, the procedure goes to block 1011.

In at least one embodiment, the model establishment module 101 can calculate the ratio of zero values to non-zero values in the adjusted differential background. When such ratio is larger than 99%, the model establishment module 101 determines that the new background frame is a stable background. When such ratio is 99% or less, the model establishment module 101 determines that the new background frame is a changing background, and keeps updating of the new background frame.

In block 1011, the model establishment module 101 sets the new background frame as a background model. In at least one embodiment, the background model can be used as a background frame for tracing a moving target.

Figure 11:
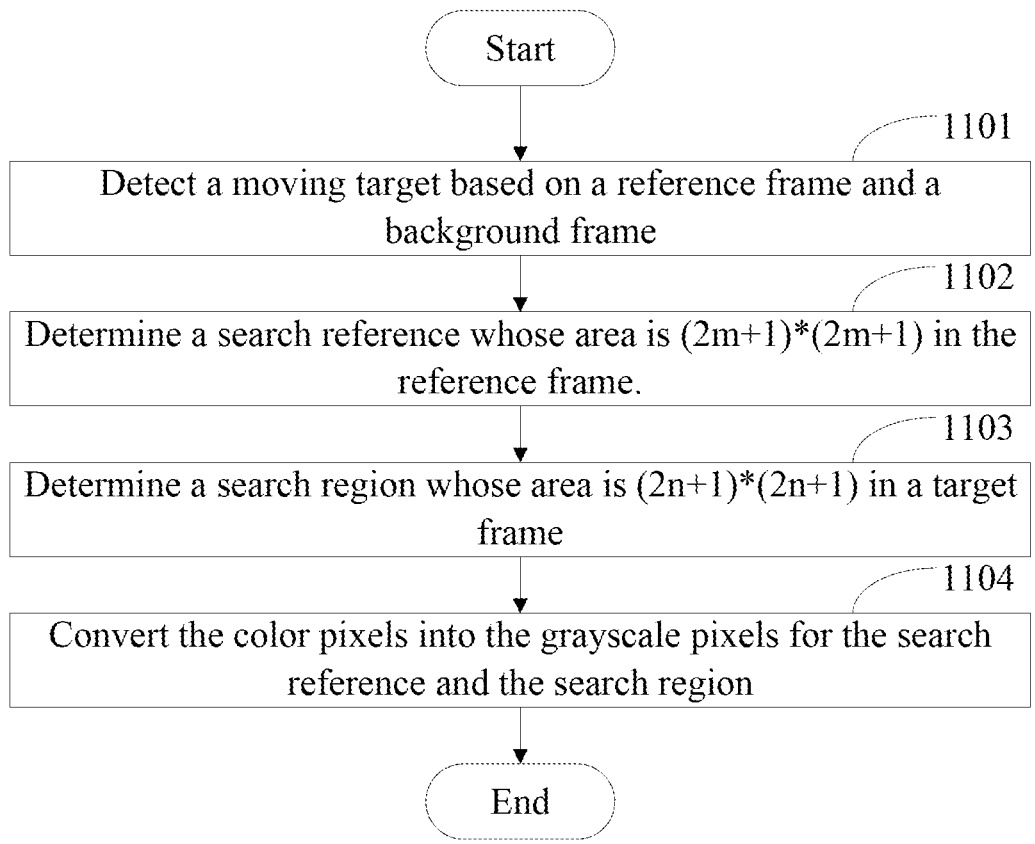
FIG. 11 illustrates a flowchart of one embodiment of a search region setting method for the electronic device of FIG. 1.

FIG. 11 illustrates a flowchart of a method in accordance with an example embodiment. The example method is provided by way of example, as there are a variety of ways to carry out the method. The method described below can be carried out using the configuration illustrated in FIG. 1, for example, and various elements of these figures are referenced in explaining example method. Each block shown in FIG. 11 represents one or more processes, methods, or subroutines, carried out in the example method. Furthermore, the order of blocks is illustrative only and can change. Additional blocks can be added or fewer blocks can be utilized, without departing from this disclosure. In one embodiment, FIG. 11 shows a detailed description of the block 92 revealed in FIG. 9, and the example method can begin at block 1101.

In block 1101, the reference determination module 102 detects a moving target based on a reference frame and a background frame.

In at least one embodiment, the reference determination module 102 can subtract the background frame from the reference frame to generate a subtracted reference. Then, the reference determination module 102 can convert the subtracted reference into the differential reference. In at least one embodiment, the reference determination module 102 can convert the subtracted reference into the differential reference by thresholding. The values equal to zero in the subtracted reference can remain as zero in the differential reference, while other values in the subtracted reference can be converted as one in the differential reference during the thresholding.

In at least one embodiment, when the differential reference is analyzed to adjust based on a method, such as mathematical morphology, the points having the value one in the adjusted differential reference can be used to show the region having the moving target. Thus, the moving target can be determined based on the adjusted differential reference and the reference frame. Thus, the reference determination module 102 can determine a reference position of the moving target in the reference frame.

In block 1102, the reference determination module 102 determines a search reference in the reference frame.

In at least one embodiment, the reference determination module 102 can determine the search reference based on the reference position of the moving target. In at least one embodiment, the center of the search reference can be the centroid of the moving target, and the area of the search reference can be $(2m+1)*(2m+1)$, wherein m can be an integer.

In block 1103, the reference determination module 102 determines a search region in a target frame.

In at least one embodiment, the reference determination module 102 can determine the search region based on the reference position of the moving target in the reference frame. In at least one embodiment, the position of the center of the search region can be the position of the centroid of the moving target in the reference frame, and the area of the search region can be $(2n+1)*(2n+1)$, wherein n can be an integer and larger than m.

In block 1104, the reference determination module 102 converts the color pixels into grayscale pixels for the search reference and the search region.

In at least one embodiment, the reference determination module 102 converts the color pixels in the search reference of the reference frame into grayscale pixels. In at least one embodiment, the reference determination module 102 converts the color pixels in an extended search region of the target frame into grayscale pixels. The area of the extended search region of the target frame can be $(2n+m+1)*(2n+m+1)$.

In the at least one embodiment, the reference determination module 102 can convert color pixels into grayscale pixels based on a formula, $G(i,j)=r(i,j)*0.299+g(i,j)*0.587+b(i,j)*0.114$, wherein $r(i,j)$, $g(i,j)$, and $b(i,j)$ are red, green, and blue values representing the color pixels, and $G(i,j)$ is grayscale values.

Figure 12:
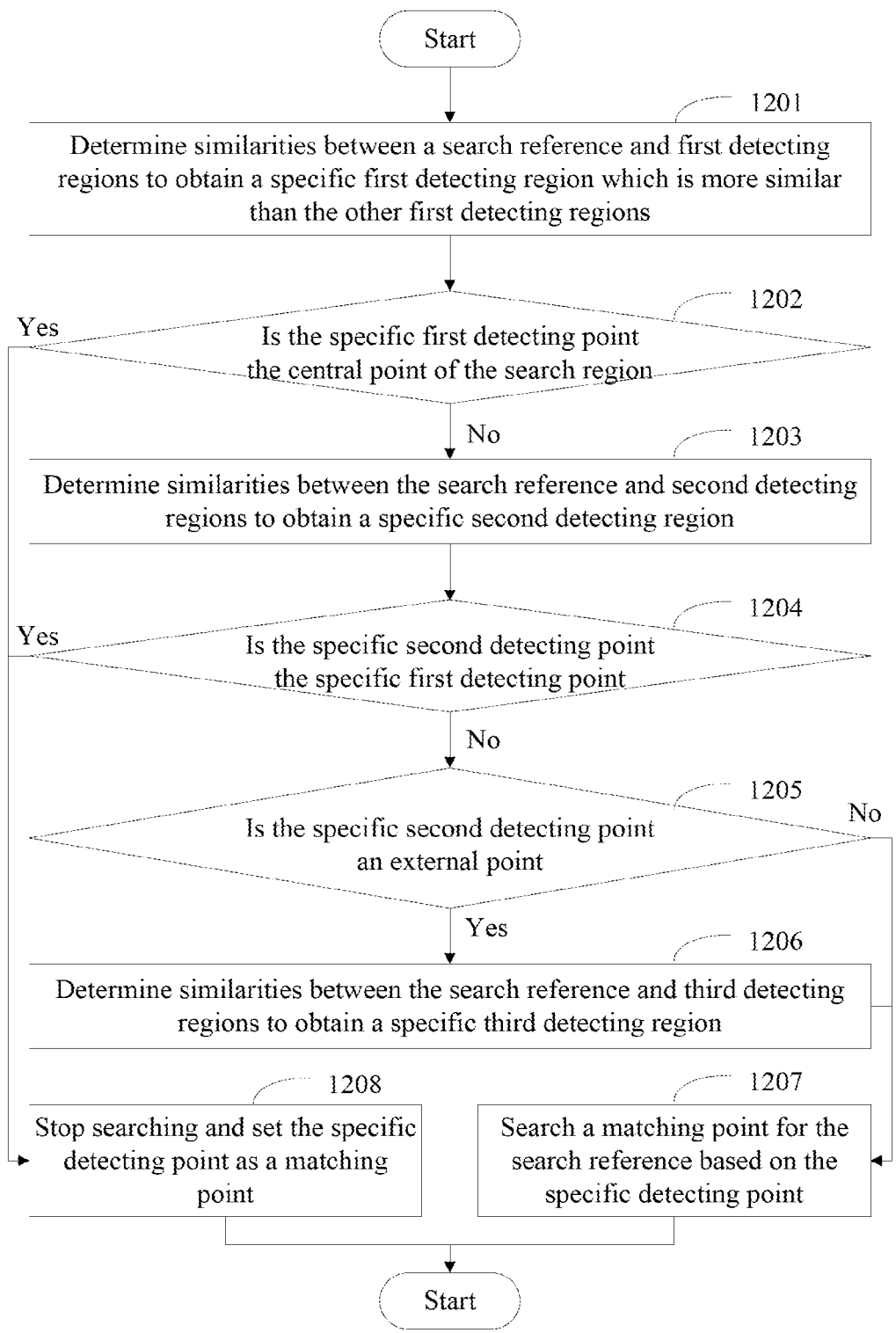
FIG. 12 illustrates a flowchart of one embodiment of an image tracking method for the electronic device of FIG. 1.

FIG. 12 illustrates a flowchart of a method in accordance with an example embodiment. The example method is provided by way of example, as there are a variety of ways to carry out the method. The method described below can be carried out using the configuration illustrated in FIG. 1, for example, and various elements of these figures are referenced in explaining example method. Each block shown in FIG. 12 represents one or more processes, methods, or subroutines, carried out in the example method. Furthermore, the order of blocks is illustrative only and can change. Additional blocks can be added or fewer blocks can be utilized, without departing from this disclosure. In one embodiment, FIG. 12 shows a detailed description of the block 93 revealed in FIG. 9, and the example method can begin at block 1102.

In block 1201, the tracking module 103 determines similarities between a search reference and first detecting regions to obtain a specific first detecting region which is more similar than the other first detecting regions. Each of the first detecting regions has a first detecting point.

In at least one embodiment, the tracking module 103 can set a central point of the search region determined by the reference determination module 102 as one of the first detecting points. The tracking module 103 can further determine four first surrounding points as four first detecting points. The central point of the four first surrounding points can be the central point of the search region. As shown in FIG. 7, the five first detecting points can be formed in the shape of a small cross M1. The tracking module 103 determines the five first detecting regions corresponding to the five first detecting points. The five first detecting points can be the centers of the first detecting regions.

In at least one embodiment, the tracking module 103 determines the similarities between the search reference and the first detecting regions to obtain a specific first detecting region which is more similar than the other first detecting regions. For example, the tracking module 103 can compare the search reference with the first detecting regions via spatiograms by a formula $\rho(h,h')=\Sigma \min(n_b,n_b')\exp[-JSD(f_b,f_b')]$, wherein $h(n_b,\mu_b,\Sigma_b)$ and $h'(n_b',\mu_b',\Sigma_b')$ are spatiograms for determining the similarity of two regions, b=1, . . . , B, B is total bins in the spatiogram of a region, $n_b$ and $n_b'$ are probabilities of the b-th bin, $\mu_b$ and $\mu_b'$ are the means of the pixel values of the b-th bin, $\Sigma_b$ and $\Sigma_b'$ are the covariances of the pixel values of the b-th bin, $f_b$ and $f_b'$ are the spatial features constructed based on Gaussian model, and $JSD(f_b,f_b')$ is the summation of the KL divergences of $f_b$ and $f_b'$.

In block 1202, the tracking module 103 determines whether the specific first detecting point of the specific first detecting region is the central point of the search region. If the specific first detecting point of the specific first detecting region is the central point of the search region, the procedure goes to block 1208. If the specific first detecting point of the specific first detecting region is not the central point of the search region, the procedure goes to block 1203. In at least one embodiment, the specific first detecting point is one of the first detecting points corresponding to the specific first detecting region.

In block 1203, the tracking module 103 determines similarities between the search reference and second detecting regions to obtain a specific second detecting region which is more similar than the other second detecting regions. Each of the second detecting regions has a second detecting point.

In at least one embodiment, the tracking module 103 can determine the specific first detecting point as one of the second detecting points. The tracking module 103 can further determine four second surrounding points as four second detecting points. The central point of the four second surrounding points is the specific first detecting point, and one of the four second surrounding points is the central point of the search region. Then, the tracking module 103 can determine similarities based on three of the second detecting points, since the similarities for the specific first detecting point and the central point of the search region are determined in block 1201.

In block 1204, the tracking module 103 determines whether the specific second detecting point of the specific second detecting region is the specific first detecting point. If the specific second detecting point is the specific first detecting point, the procedure goes to block 1208. If the specific second detecting point is not the specific first detecting point, the procedure goes to block 1205. In at least one embodiment, the specific second detecting point is one of the second detecting points corresponding to the specific second detecting region.

In block 1205, the tracking module 103 determines whether the specific second detecting point of the specific second detecting region is an external point. If the specific second detecting point is an external point, the procedure goes to block 1206. If the specific second detecting point is not an external point, the procedure goes to block 1207.

In at least one embodiment, as shown in FIG. 8, the nine detecting points can be formed in the shape of a large cross M2. The tracking module 103 can determine detecting regions corresponding to the nine detecting points including a central point, four first surrounding points, and four external points. Each of the nine detecting points is the central point of the detecting region. Therefore, the tracking module 103 can determine whether the specific second detecting point is one of the four external points based on the large cross M2.

In block 1206, the tracking module 103 determines similarities between the search reference and third detecting regions to obtain a specific third detecting region which is more similar than the other third detecting regions. Each of the third detecting regions has a third detecting point.

In at least one embodiment, the tracking module 103 can determine the second detecting point as one of the third detecting points, and determine the other three external points as the other third detecting points as shown in FIG. 8. Therefore, the tracking module 103 can determine similarities based on the third detecting regions corresponding to the third detecting points.

In block 1207, the tracking module 103 searches a matching region for the search reference based on the specific second or third detecting point. The matching region has a matching point.

In at least one embodiment, the tracking module 103 can search the matching region based on the specific second or third detecting point via diamond search method. The diamond search method is well known in the art.

In block 1208, the tracking module 103 stops searching and determines the specific first or second detecting point as the matching point. In at least one embodiment, the tracking module 103 can determine the specific first or second detecting region corresponding to the matching point is the matching region. Therefore, the matching point is the actual position of the moving target in the target frame.

The embodiments shown and described above are only examples. Even though numerous characteristics and advantages of the present technology have been set forth in the foregoing description, together with details of the structure and function of the present disclosure, the disclosure is illustrative only, and changes can be made in the detail, including in matters of shape, size, and arrangement of the parts within the principles of the present disclosure, up to and including the full extent established by the broad general meaning of the terms used in the claims.

What is claimed is:

1. An electronic device, comprising:
    a processor; and
    a storage device configured to store a plurality of instructions, which when executed by the processor, causes the processor to:
    receive at least three initial frames;
    generate differential frames between the at least three initial frames;
    check continuity of each differential frame to adjust the differential frames;
    generate an original background frame and a new background frame based on the adjusted differential frames;
    generate a differential background and a subtracted background based on the original background frame and the new background frame;
    convert the subtracted background into the differential background by thresholding, and retain values equal to zero in the subtracted background as zero in the differential background and convert other values in the subtracted background to value one in the differential background during the thresholding;

calculate a proportion of the number of zero values to the sum of the number of zero values and non-zero values in the differential background;
determine that the new background frame is stable when the proportion is more than 99%;
receive a reference frame;
determine a moving target in the reference frame based on the new background frame;
receive a target frame for tracking the moving target included in a search reference of the reference frame;
set at least one first detecting region in the target frame;
determine at least one similarity between the search reference and the at least one first detecting region;
determine a specific one of the at least one first detecting region in the target frame based on the at least one similarity; and
determine an actual position of the moving target based on the specific first detecting region.

2. The electronic device according to claim 1, wherein the at least one first detecting region is set in a search region generated based on a reference position of the moving target in the search reference of the reference frame.

3. The electronic device according to claim 2, further comprising instructions to:
subtract between two consecutive frames of the at least three initial frames to form-subtracting frames;
change nonzero values in the subtracting frames into one to form the differential frames;
detect a discrete gap between two separate segments along a first line in the differential frames;
adjust the discrete gap in the differential frames when the two separate segments are coupled to another segment in a second line neighboring the first line;
compare the adjusted differential frames to generate a parameter frame; and
generate the new background frame based on the parameter frame.

4. The electronic device according to claim 1, wherein each of the at least one first detecting region is corresponding to a detecting point, and a central point of the at least one detecting point is one of the at least one detecting point.

5. The electronic device according to claim 4, wherein each of the at least one detecting point is a center of the corresponding first detecting region.

6. The electronic device according to claim 4, further comprising instructions to:
set at least one second detecting region in the target frame based on the specific first detecting region if a specific detecting point corresponding to the specific first detecting region is not the central point of the at least one detecting point;
determine the at least one similarity between the moving target and the at least one second detecting region;
determine a specific one of the at least one second detecting region in the target frame based on the at least one similarity; and
determine the actual position of the moving target based on the specific second detecting region.

7. The electronic device according to claim 1, wherein the specific first detecting region is determined when the specific first detecting region is more similar to the search reference than the other first detecting regions.

8. A method for tracking a moving target in a target frame captured by an image capturing device, the method comprising:
receiving at least three initial frames;
generating differential frames between the at least three initial frames;
checking continuity of each differential frame to adjust the differential frames;
generating an original background frame and a new background frame based on the adjusted differential frames;
generating a differential background and a subtracted background based on the original background frame and the new background frame;
converting the subtracted background into the differential background by thresholding, and retaining values equal to zero in the subtracted background as zero in the differential background and converting other values in the subtracted background to value one in the differential background during the thresholding;
calculating a proportion of the number of zero values to the sum of the number of zero values and non-zero values in the differential background;
determining that the new background frame is stable when the proportion is more than 99%;
receiving a reference frame;
determining the moving target in the reference frame based on the new background frame;
receiving the target frame for tracking the moving target included in a search reference of the reference frame;
setting at least one first detecting region in the target frame;
determining at least one similarity between the search reference and the at least one first detecting region;
determining a specific one of the at least one first detecting region in the target frame based on the at least one similarity; and
determining an actual position of the moving target based on the specific first detecting region.

9. The method according to claim 8, wherein the at least one first detecting region is set in a search region generated based on a reference position of the moving target in the search reference of the reference frame.

10. The method according to claim 9, further comprising:
subtracting between two consecutive frames of the at least three initial frames to form subtracting frames;
changing nonzero values in the subtracting frames into one to form the differential frames;
detecting a discrete gap between two separate segments along a first line in the differential frames;
adjusting the discrete gap in the differential frames when the two separate segments are coupled to another segment in a second line neighboring the first line;
comparing the adjusted differential frames to generate a parameter frame; and
generating the new background frame based on the parameter frame.

11. The method according to claim 8, wherein each of the at least one first detecting region is corresponding to a detecting point, and a central point of the at least one detecting point is one of the at least one detecting point.

12. The method according to claim 11, further comprising:
setting at least one second detecting region in the target frame based on the specific first detecting region if a specific detecting point corresponding to the specific first detecting region is not the central point of the at least one detecting point;
determining the at least one similarity between the moving target and the at least one second detecting region;

determining a specific one of the at least one second detecting region in the target frame based on the at least one similarity; and determining the actual position of the moving target based on the specific second detecting region.

13. The method according to claim 8, wherein the specific first detecting region is determined when the specific first detecting region is more similar to the search reference than the other first detecting regions.

* * * * *